(12) United States Patent
Hentges et al.

(10) Patent No.: US 7,710,688 B1
(45) Date of Patent: May 4, 2010

(54) SPLIT EMBEDDED SIGNAL TRANSMISSION PLANES IN INTEGRATED LEAD DISK DRIVE SUSPENSIONS

(75) Inventors: Reed T. Hentges, Buffalo, MN (US); Alexander J. Rice, Hutchinson, MN (US); Michael E. Roen, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 585 days.

(21) Appl. No.: 11/702,723

(22) Filed: Feb. 6, 2007

(51) Int. Cl.
*G11B 5/48* (2006.01)
(52) U.S. Cl. .................................. 360/245.9
(58) Field of Classification Search ............... 360/245.9
See application file for complete search history.

(56) References Cited

U.S. PATENT DOCUMENTS

| | | | |
|---|---|---|---|
| 5,608,591 A | 3/1997 | Klaassen | |
| 5,694,270 A * | 12/1997 | Sone et al. ............... | 360/245.9 |
| 5,737,152 A * | 4/1998 | Balakrishnan ........... | 360/245.9 |
| 5,754,369 A | 5/1998 | Balakrishnan | |
| 5,862,010 A * | 1/1999 | Simmons et al. ......... | 360/97.01 |
| 5,986,853 A * | 11/1999 | Simmons et al. ......... | 360/245.9 |
| 5,995,328 A | 11/1999 | Balakrishnan | |
| 6,429,113 B1 * | 8/2002 | Lewis et al. .................. | 438/612 |
| 6,762,913 B1 | 7/2004 | Even et al. | |
| 6,940,697 B2 | 9/2005 | Jang et al. | |
| 7,046,483 B2 | 5/2006 | Erpelding | |
| 7,064,928 B2 | 6/2006 | Fu et al. | |
| 7,079,357 B1 | 7/2006 | Kulangara et al. | |
| 7,092,215 B2 | 8/2006 | Someya et al. | |
| 7,320,174 B2 * | 1/2008 | Cowles et al. .................. | 29/852 |
| 2004/0181932 A1 * | 9/2004 | Yao et al. .................. | 29/603.03 |
| 2005/0078416 A1 * | 4/2005 | Shiraishi et al. .......... | 360/245.9 |

FOREIGN PATENT DOCUMENTS

| | | |
|---|---|---|
| EP | 0834867 | 5/2007 |
| WO | WO98/20485 | 5/1998 |

* cited by examiner

*Primary Examiner*—Mark Blouin
(74) *Attorney, Agent, or Firm*—Faegre & Benson LLP

(57) ABSTRACT

A disk drive head suspension flexure having a gimbal region and a tail includes a metal base layer, an insulation layer over the base layer and two or more pairs of adjacent traces extending over the insulation layer from the gimbal region to the tail. Each trace includes terminals on the gimbal region and tail. Two or more conductive metal signal transmission planes are embedded within the insulation layer and extend from the gimbal region to the tail between the pairs of traces and metal base layer. Each of the embedded signal transmission planes has a width extending across a width of a pair of the traces. Terminals on the gimbal region and tail are coupled to the signal transmission planes by connection vias extending through the insulation layer.

11 Claims, 4 Drawing Sheets

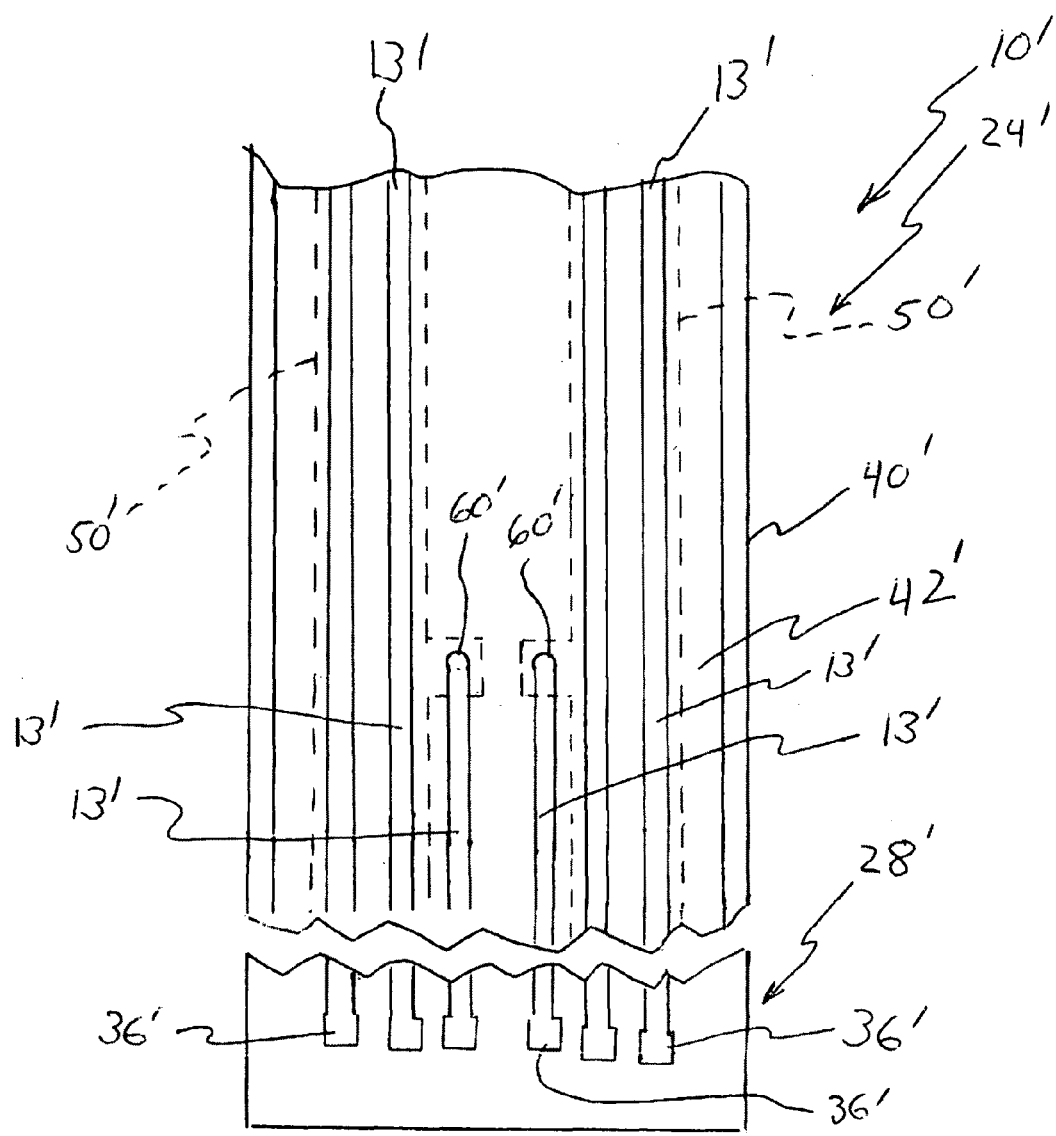

SPLIT EMBEDDED SIGNAL TRANSMISSION PLANES IN INTEGRATED LEAD DISK DRIVE SUSPENSIONS

FIELD OF THE INVENTION

The present invention relates generally to disk drive head suspensions. In particular, the invention is an integrated lead flexure for a suspension.

BACKGROUND OF THE INVENTION

Disk drive head suspensions with wireless or integrated lead flexures are generally known and disclosed, for example, in PCT Application No. WO 98/20485 and the following U.S. Patents, all of which are incorporated herein by reference.

| Inventor | U.S. Pat. No. |
|---|---|
| Klaassen | 5,608,591 |
| Sone et al. | 5,694,270 |
| Balakrishnan | 5,754,369 |
| Simmons et al. | 5,862,010 |
| Simmons et al. | 5,986,853 |
| Balakrishnan | 5,995,328 |
| Even et al. | 6,762,913 |
| Jang et al. | 6,940,697 |
| Erpelding | 7,046,483 |
| Fu et al. | 7,064,928 |
| Kulangara et al. | 7,079,357 |

The continuing development of read/write head and associated disk drive technology requires head suspensions having improved mechanical and electrical performance. For example, increasing numbers of signal conducting traces are needed on suspensions to accommodate the increasing complexity of the read/write heads and the incorporation of integrated circuit (IC) chips onto the suspensions themselves. At the same time, the physical size of the suspensions is decreasing. Meeting these requirements with small traces having high bandwidth and low impedance is increasingly difficult.

There is, therefore, a continuing need for improved head suspensions and components. In particular, there is a need for flexures capable of handling increasing numbers of signals. The signal conducting traces must provide high bandwidths and low impedances. To be commercially viable, any such flexure must be efficient to manufacture.

SUMMARY OF THE INVENTION

The invention is a head suspension flexure having enhanced signal carrying capabilities. One embodiment of the invention includes a metal base layer, an insulation layer over the base layer, four or more traces over the insulation layer and two or more embedded signal transmission structures. Each trace includes spaced-apart terminals. Each signal transmission structure includes a conductive metal plane within the insulation layer, spaced-apart terminals over the insulation layer and connection vias through the insulation layer coupling the terminals and the metal planes. The metal planes have a width extending across at least a substantial portion of a width of two or more of the traces.

BRIEF DESCRIPTION OF THE DRAWINGS

FIG. 5 is a detailed schematic top view of a portion of a flexure having embedded signal transmission structures in accordance with another embodiment of the invention.

DETAILED DESCRIPTION OF THE PREFERRED EMBODIMENTS

Figure 1:
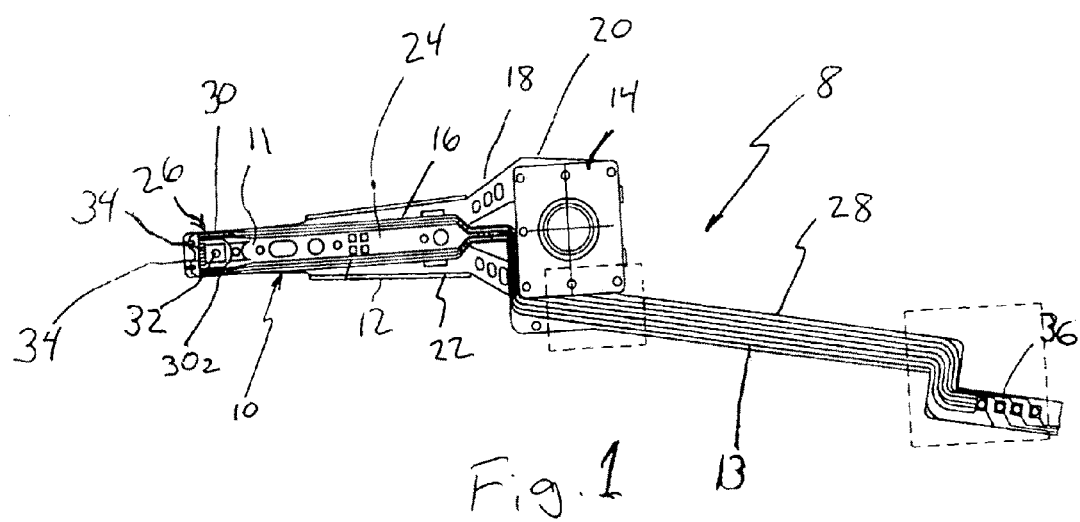
FIG. 1 is an illustration of a head suspension having a flexure with traces and embedded signal transmission structures in accordance with one embodiment of the invention.

A disk drive head suspension 8 including a flexure 10 having embedded signal transmission structures 11 and traces 13 in accordance with one embodiment of the present invention is illustrated generally in FIG. 1. Suspension 8 is a three-piece assembly in the illustrated embodiment, and includes a load beam 12 and base plate 14 in addition to the flexure 10. Load beam 12, which is typically formed from stainless steel, includes a beam region 16, hinge or spring region 18 and mounting region 20. Rails 22 are formed on the side edges of the beam region 16. Base plate 14 is welded to the mounting region 20 at the proximal end of the load beam 12. Although not shown in FIG. 1, all or portions of the flexure 10 (e.g., portions over traces 13) can be covered by an insulating covercoat.

Flexure 10 is an integrated lead or wireless flexure and includes a mounting or base region 24 that is welded or otherwise attached to the beam region 16 of load beam 12, a gimbal region 26 at its distal end, and a tail 28 extending from the proximal end of the base region. The gimbal region 26 includes a pair of laterally-spaced spring arms $30_1$ and $30_2$ extending from the base region 24, and a slider mounting region 32 that extends from and is supported by and between the spring arms. A plurality of head bond pads 34 are located on the gimbal region 26 adjacent to the slider mounting region 32. A plurality of terminal pads 36 are located on the proximal end of the flexure tail 28. When flexure 10 is incorporated into a disk drive, a slider (not shown) having read/write heads is attached to the slider mounting region 32 and the read/write heads are electrically coupled to the head bond pads 34. The terminal pads 36 are electrically connected to electronic systems (not shown) in the disk drive. Signal transmission structures 11 and traces 13 electrically connect spaced-apart pairs of bond pads 34 and terminal pads 36 to couple electrical signals between the read/write heads and the disk drive electronics.

Figure 2:
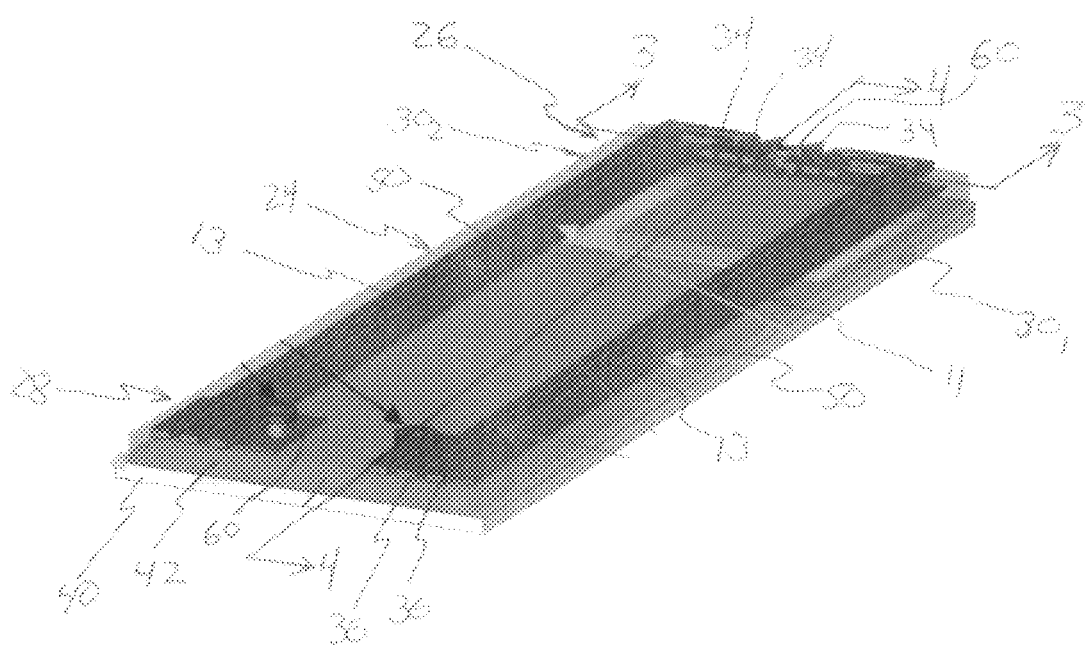
FIG. 2 is a detailed schematic illustration of the flexure shown in FIG. 1.
Figure 3:
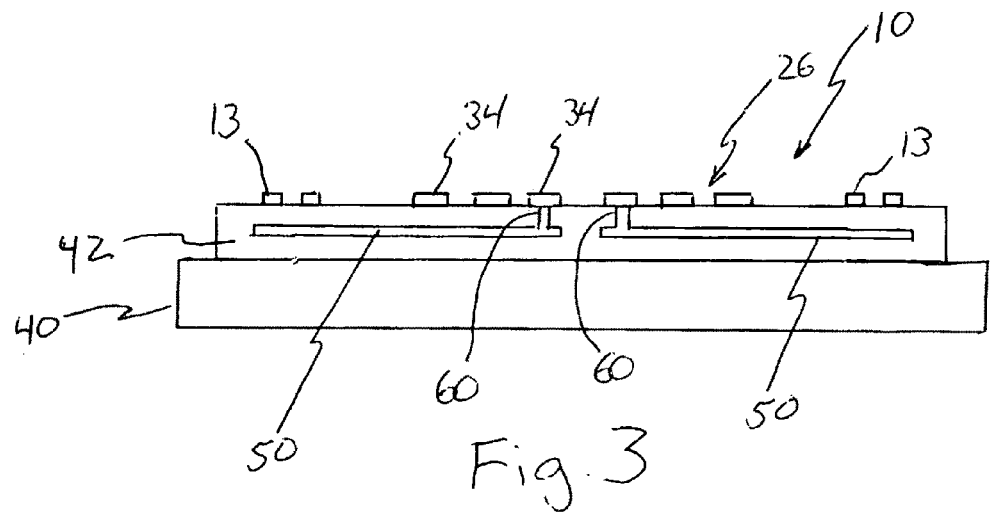
FIG. 3 is cross sectional view of a portion of the flexure shown in FIG. 2, taken at line 3-3 in FIG. 2.
Figure 4:
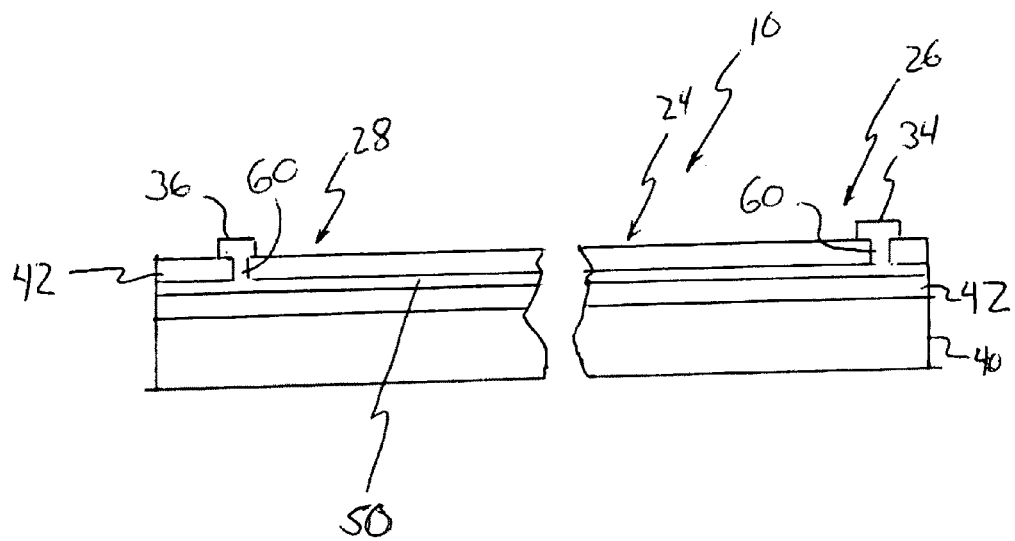
FIG. 4 is cross sectional view of another portion of the flexure shown in FIG. 2, taken at line 4-4 in FIG. 2.

Embedded signal transmission structures 11 and traces 13 can be described in greater detail with reference to FIGS. 2-4. FIG. 2 is a detailed schematic representation of the flexure 10. FIG. 3 is a cross section of the flexure 10 taken from line 3-3 across the head bond pads 34 in FIG. 2. FIG. 4 is a cross section of the flexure 10 taken from line 4-4 along the length of one of the transmission structures 11. As shown, portions of the base region 24, gimbal region 26 and tail 28 include a base or structural spring metal layer 40 and an insulating layer 42. In one embodiment of the invention the spring metal layer 40 is stainless steel and the insulating layer 42 is polyimide, but other suitable materials can be used in other embodiments (not shown).

The illustrated embodiment of flexure 10 includes four traces 13 arranged in two pairs of two adjacent traces. Each of the traces 13 of a first pair extends from a head bond pad 34 on a first lateral side of the gimbal region 26, around the spring arm $30_1$, and over the flexure base region 24 and tail 28 to one of the terminal pads 36. Similarly, each of the traces 13 of a second pair extends from a head bond pad 34 on a second lateral side of the gimbal region 26, around the spring arm 30₂, and over the flexure base region 24 and tail 28 to another of the terminal pads 36. Other embodiments of the invention (not shown) have greater numbers of traces. In still other embodiments (not shown), some of the traces are arranged in one or more groups of three or more traces. Still other embodiments (also not shown) also include one or more single traces spaced from others on the flexure.

Two embedded signal transmission structures 11 are shown in the illustrated embodiment of flexure 10. Each of the transmission structures 11 includes a generally planar conductive metal layer 50 and connection vias 60. The conductive metal layers 50 are embedded within or generally covered on at least their opposite surfaces by the insulating layer 42. The surfaces of the conductive metal layers 50 are thereby spaced and electrically insulated from the spring metal layer 40 and the traces 13. Each of the conductive metal layers 50 is located between one of the pairs of traces 13 and the spring metal layer 40, and has a width that extends across at least a substantial portion of the width of the pairs of traces. In the embodiment shown, the conductive metal layers 50 have a width that is greater than the width of the pairs of traces 13. In other embodiments (not shown) the advantageous features of the invention are achieved by conductive metal layers 50 having widths that extend under at least portions, but not all, of each trace 13 of the pairs.

The conductive metal layers 50 in the illustrated embodiment are split and located on opposite sides of the flexure 10. A first conductive metal layer 50 is electrically coupled by a connection via 60 to a head bond pad 34 on a first lateral side of the gimbal region 26 and extends around and/over spring arm 30₁ and over the flexure base region 24 and tail 28 to one of the terminal pads 36 to which it is coupled by a connection via 60. Similarly, a second conductive metal layer 50 is electrically coupled by a connection via 60 to a head bond pad 34 on a second lateral side of the gimbal region 26 and extends around and/or over spring arm 30₂ and over the flexure base region 24 and tail 28 to another of the terminal pads 36 to which it is coupled by a connection via 60. As shown, connection vias 60 extend through the insulating layer 42. The electrical performance of flexure 10 is generally optimized by conductive metal layers 50 having a width at least as great as that of the pair of traces 13 along the entire length of the traces, including at the gimbal spring regions 30₁, and 30₂, base region 24 and tail 28 as is shown in the illustrated embodiment. However, in other embodiments (not shown) the conductive metal layers can have portions at one or more locations along their lengths with widths that are less than the width of the adjacent pairs of traces 13.

Conductive metal layers 50 can effectively function as signal transmitting traces. By way of non-limiting examples, they can be used as ground or DC power paths, for low frequency actuation signals, or as an AC coupling plane for signals on traces 13. Conductive metal layers 50 can also be used during the manufacture of flexures 10 as electrical paths to isolated features for electroplating operations. When used as ground planes to isolate pairs of read and write traces the conductive metal layers 50 can reduce cross-talk. Ground noise that might otherwise have been coupled to the read traces can be significantly reduced. Impedance of the traces is also reduced without increasing losses. The effective impedance of the traces above the conductive metal layer can be controlled by windowing the conductive metal layer (not shown). This windowing allows further optimization of the impedance profile of trace pairs.

Flexure 10 can be manufactured using conventional or otherwise known additive and/or subtractive processes including photolithography, wet and dry etching, electroplating and other deposition processes. For example, the insulating layer 42 can be formed in two stages. During a first stage a lower portion of the insulating layer 42 is formed on the surface of the spring metal layer 40. The conductive metal layers 50 can then be formed on the lower portion of the insulating layer 42. An upper portion of the insulating layer 42 can be formed on the conductive metal layers 50 and exposed areas of the lower portions of the insulating layer during a second stage.

FIG. 5 is a schematic illustration of a portion of a base region 24' and tail 28' of a flexure 10' in accordance with another embodiment of the invention. Features of flexure 10' that are substantially the same or similar to those of flexure 10 described above in connection with FIGS. 1-4 are identified by similar reference numbers. As shown, the conductive metal layers 50' are electrically connected by connection vias 60' on the base region 24' to traces 13' that extend from the connection vias to terminal pads 36' on tail 28'. The conductive metal layers 50' thereby function to transmit electrical signals only from the base region 24' to the gimbal region 26' (not shown), with traces 13' being used to transmit the signals between the base region and tail 28'. Structures such as that shown in FIG. 5 can be used in connection with integrated circuit (IC) chips that are mounted to the flexure 10'. In still other embodiments (not shown), the conductive metal layers are used to transmit the signals from the tail of the flexure to the mounting region (e.g., to an IC on the mounting region), with traces being used to transmit the signals from the mounting region to the gimbal region. Various combinations of the conductive ground plane structures described above can also be incorporated into the flexures.

Although the present invention has been described with reference to preferred embodiments, those skilled in the art will recognize that changes can be made in form and detail without departing from the spirit and scope of the invention.

What is claimed is:

1. A disk drive head suspension flexure of the type having a base region and a gimbal region extending from the base region, including:
    a metal base layer in the base region and the gimbal region;
    an insulation layer over the base layer in the base region and the gimbal region;
    at least two traces over the insulation layer on a first side of the gimbal region and at least two traces over the insulation layer on a second side of the gimbal region, each trace including spaced-apart terminals;
    two or more embedded signal transmission structures, including:
        a first conductive metal plane within the insulation layer on the first side of the gimbal region, the metal plane having a width extending across at least a substantial portion of a width of the two or more of the traces on the first side of the gimbal region;
        a second conductive metal plane within the insulation layer on the second side of the gimbal region, the metal plane having a width extending across at least a substantial portion of a width of the two or more of the traces on the second side of the gimbal region;
        spaced-apart terminals over the insulation layer; and
        connection vias through the insulation layer coupling the terminals and the metal planes.

2. The flexure of claim 1 wherein the conductive metal planes extend from the gimbal region to the base region.

3. The flexure of claim 2 wherein the conductive metal planes extend through the base region.

4. The flexure of claim 3 wherein:
the flexure includes a tail extending from the base region; and
the conductive metal planes extend from the base region through the tail.

5. The flexure of claim 1 wherein the embedded signal transmission structures include terminals and connection vias through the insulation layer at the base region.

6. The flexure of claim 1 wherein:
the flexure includes a tail extending from the base region; and
the embedded signal transmission structures include terminals and connection vias through the insulation layer at the tail.

7. The flexure of claim 1 wherein the embedded signal transmission structures include terminals and connection vias through the insulation layer at the gimbal region.

8. The flexure of claim 1 wherein the conductive metal planes extend a substantial portion of a length of the traces.

9. The flexure of claim 1 wherein one or more of the conductive metal planes includes one or more portions having widths extending less than a substantial portion of a width of the two or more of the traces.

10. The flexure of claim 1 wherein one or more of the conductive metal planes includes windows adjacent to at least two traces.

11. A disk drive head suspension flexure having a gimbal region, a base region and a tail, including:
a metal base layer;
an insulation layer over the base layer;
at least two traces over the insulation layer extending from the gimbal region to the tail on a first side of the flexure and including terminals on the gimbal region and tail; and
at least two traces over the insulation layer extending from the gimbal region to the tail on a second side of the flexure and including terminals on the gimbal region and tail; and
two or more embedded signal transmission structures, including:
a first conductive metal plane within the insulation layer extending from the gimbal region to the tail on a first side of the flexure, the conductive metal plane having a width extending across at least a substantial portion of a width of the at least two traces on the first side of the flexure;
a second conductive metal plane within the insulation layer extending from the gimbal region to the tail on a second side of the flexure, the conductive metal plane having a width extending across at least a substantial portion of a width of the at least two traces on the second side of the flexure;
terminals over the insulation layer on the gimbal region and tail; and
connection vias through the insulation layer for coupling the first and second conductive metal planes to the terminals on the gimbal region and tail.

* * * * *